United States Patent Office.

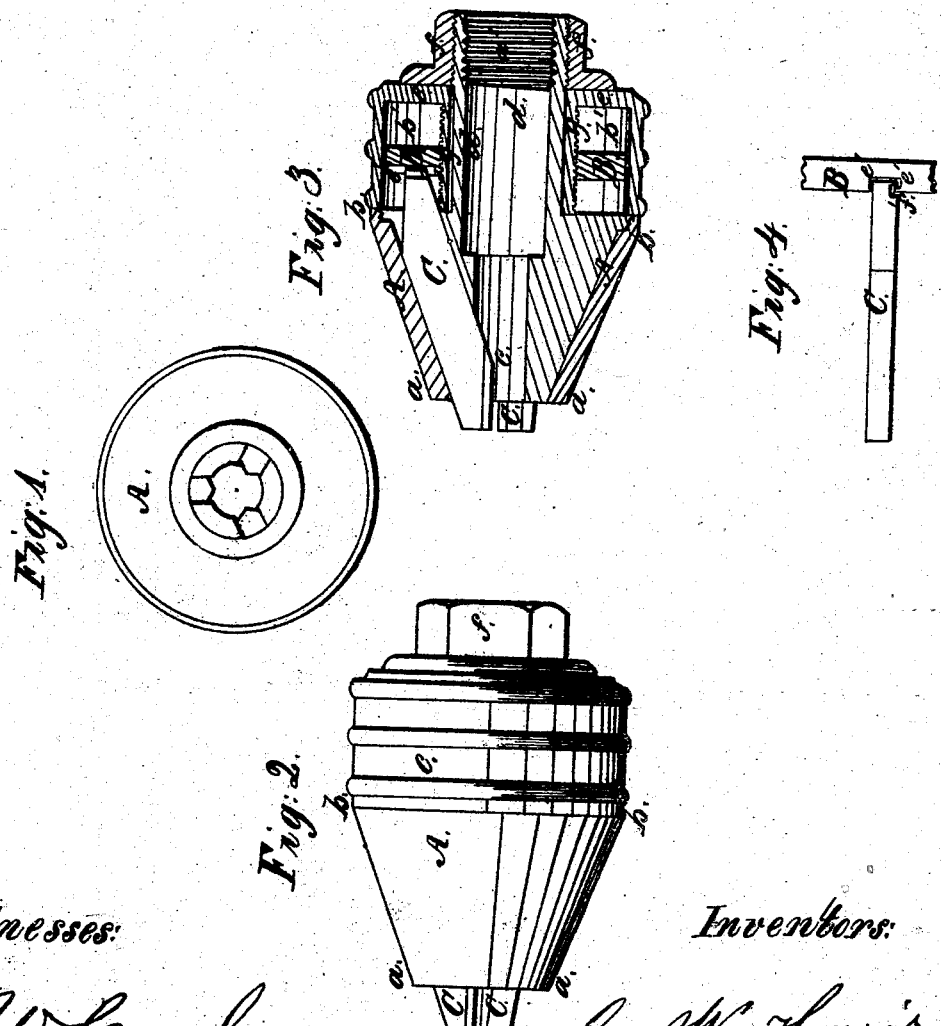

GEORGE W. HARRIS AND WILLIAM H. HAIGHT, OF NEW YORK, N. Y., ASSIGNORS TO WILLIAM H. HAIGHT, OF THE SAME PLACE.

Letters Patent No. 66,081, dated June 25, 1867.

IMPROVEMENT IN CHUCKS.

The Schedule referred to in these Letters Patent and making part of the same.

TO ALL WHOM IT MAY CONCERN:

Be it known that we, GEORGE W. HARRIS and WILLIAM H. HAIGHT, of the city, county, and State of New York, have invented a new and useful Improvement in Chucks; and we do hereby declare that the following is a full, clear, and exact description of the same, reference being had to the accompanying drawings, making a portion of this specification, in which—

Figure 1 is an end view of a chuck, constructed according to our invention.

Figure 2 is a side view of the same.

Figure 3 is a central longitudinal section of the same.

Figure 4 is a detached view of a portion of the same.

Similar letters of reference indicate corresponding parts in all the figures.

This invention consists in an operating ring, constructed with an internal screw and a suitable sliding-nut, in combination with a conical shell and sliding griping-jaws, whereby a strong and simple chuck, especially adapted for holding drills, wire, or other small articles, is secured.

To enable others to understand the construction and operation of our invention, we will proceed to describe it with reference to the drawings.

The shell A of the chuck is of conical form, as shown at $a\ b$, and is constructed with a central slot or opening, $c$, at the rear end of which is formed an internal screw, $a'$, by means of which the chuck is attached to the spindle or mandrel of the lathe. The cylindrical tubular neck $d$, which extends back from the shell, has fitted upon it the broad operating ring $e$, which is retained in place thereon by a flanged nut, $f$, screwed upon the end of the aforesaid neck. The operating ring just mentioned is constructed with a wide and deep annular groove, $b'$, in its forward side, which receives the sliding-nut B, screwed upon the internal screw $g$, formed by the central portion of the aforesaid operating ring $e$. Provided longitudinally in the conical shell A, at equal distances apart, and in positions nearly or quite parallel with the inclined outer sides thereof, are three slots or guides, which receive the sliding-jaws or dogs C, the inner or rear ends of which are fitted into radial grooves $e'$, formed in the front side of the nut B, the said grooves being constructed with flanches or lips $f$, which fit into transverse grooves or recesses in one side of such ends of each of the jaws C, in such manner that the said jaws, being thus attached to the nut B, are moved forward or back, as the case may be, by the sliding movement of the nut.

The drill, wire, or other article to be held or chucked, is inserted between the forward ends of the jaws or dogs C, and the operating ring $e$ is turned around in such direction as to cause the internal screw $g$ to move forward the nut B, and consequently to force forward the jaws C, which move in their inclined guides, hereinbefore described, in such manner that their outer or forward ends aforesaid are made to approach each other, and thus forcibly grasp the article placed between them. In order to remove the said article from the chuck, the operating ring $e$ is turned in an opposite direction, and, acting through the nut B, draws back the jaws in their inclined guides, thus bringing their forward ends away from each other to release the article held between them.

What we claim as our invention, and desire to secure by Letters Patent, is—

The operating ring $e$, constructed with the internal screw $g$, and the nut B, formed with radial grooves $e$, in combination with the conical shell A and sliding-jaws C, substantially as and for the purpose herein described.

GEO. W. HARRIS.
WM. H. HAIGHT.

Witnesses:
J. W. COOMBS,
GEO. W. REED.